United States Patent
Baker et al.

(10) Patent No.: US 9,121,700 B2
(45) Date of Patent: Sep. 1, 2015

(54) SURVEYING AND LEVELING DEVICE

(71) Applicants: John D. Baker, Bennett, CO (US); Reed W. Baker, Strasburg, CO (US); Michael J. Gregory, Aurora, CO (US)

(72) Inventors: John D. Baker, Bennett, CO (US); Reed W. Baker, Strasburg, CO (US); Michael J. Gregory, Aurora, CO (US)

(73) Assignee: RM Asset Group, LLC, Aurora, CO (US)

( * ) Notice: Subject to any disclaimer, the term of this patent is extended or adjusted under 35 U.S.C. 154(b) by 254 days.

(21) Appl. No.: 13/627,861

(22) Filed: Sep. 26, 2012

(65) Prior Publication Data

US 2013/0074349 A1     Mar. 28, 2013

Related U.S. Application Data

(60) Provisional application No. 61/539,054, filed on Sep. 26, 2011.

(51) Int. Cl.
| | |
|---|---|
| *G01D 21/00* | (2006.01) |
| *G01C 9/02* | (2006.01) |
| *G01C 9/16* | (2006.01) |
| *G01C 9/00* | (2006.01) |
| *G01C 9/10* | (2006.01) |
| *G01B 11/275* | (2006.01) |
| *G01C 17/00* | (2006.01) |
| *G01C 19/00* | (2013.01) |
| *G01C 5/00* | (2006.01) |
| *G01C 1/02* | (2006.01) |
| *G01C 9/26* | (2006.01) |
| *G01C 15/10* | (2006.01) |
| *G01C 9/24* | (2006.01) |

(52) U.S. Cl.
CPC .. *G01C 9/02* (2013.01); *G01C 9/16* (2013.01); *G01C 9/10* (2013.01); *G01C 9/24* (2013.01); *G01C 9/26* (2013.01); *G01C 15/10* (2013.01)

(58) Field of Classification Search
CPC ............ G01C 15/10; G01C 9/24; G01C 9/26; G01C 9/10
USPC ........... 33/353, 365, 645, 228, 370, 301, 290, 33/283, 299
See application file for complete search history.

(56) References Cited

U.S. PATENT DOCUMENTS

| | | | | |
|---|---|---|---|---|
| 2,343,688 | A * | 3/1944 | Maxey .......................... | 248/546 |
| 2,346,006 | A * | 4/1944 | Burt ............................. | 33/290 |
| 2,377,045 | A * | 5/1945 | Brunswick ..................... | 73/455 |
| 4,617,820 | A * | 10/1986 | Hammond ..................... | 73/1.75 |
| 5,575,073 | A * | 11/1996 | von Wedemayer ............. | 33/365 |
| 7,984,541 | B1 | 7/2011 | Davidson | |
| 8,026,717 | B1 * | 9/2011 | Biary ............................ | 324/228 |
| 2010/0229415 | A1 * | 9/2010 | Knudsen ......................... | 33/613 |

\* cited by examiner

*Primary Examiner* — Laura Martin
*Assistant Examiner* — Rhyan C Lange
(74) *Attorney, Agent, or Firm* — Sheridan Ross P.C.

(57) ABSTRACT

A surveying and measuring device and method of using the same is provided. The device, which is particularly suited for determining or measuring a rotational position of an object, comprises an elongate rigid member extending radially away from a known center of an object. Distal ends of the rigid member downwardly project points which may be compared to, for example, survey markers or known points.

17 Claims, 5 Drawing Sheets

SURVEYING AND LEVELING DEVICE

The present application claims the benefit of priority from U.S. Provisional Patent Application No. 61/539,054, filed Sep. 26, 2011, the entire disclosure of which is hereby incorporated by reference in its entirety.

FIELD OF THE INVENTION

The present invention relates generally to devices and methods for use in surveying and related installation or construction. More specifically, the present invention relates to devices and methods for measuring, leveling, centering, and/or orienting various objects with respect to a predetermined reference point.

BACKGROUND

In various installation and construction operations, it is often necessary to position various features with a high degree of accuracy. For example, in high precision operations such as the construction of airport runways and various related features, regulations imposed by various government agencies may require that certain features be permanently installed with a very small margin of error. The Federal Aviation Administration requires, for example, that runway lights be positioned and comprise not more than one degree of offset from a prescribed position. Such a margin of error translates to approximately five millimeters of rotation at the outer circumference of the light. Typically, if such features are installed improperly, error is not recognized until after the feature is encased in large amounts of concrete. Corrective actions are therefore complicated and require substantial time and monetary expenditures.

Current methods and systems for measuring and installing features with high levels of accuracy comprise significant amounts of guess-and-check work, numerous measurements and calculations from known surveying features, and are typically time consuming. Such methods and systems therefore typically consume unnecessary man hours and unduly protract the duration of activities already subject to significant time constraints.

SUMMARY OF THE INVENTION

Accordingly, the present invention contemplates a novel system, device, and methods for measuring, leveling, and/or installing features with a high degree of accuracy.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

In various embodiments, the present invention comprises an apparatus for evaluating the position of a feature in at least one of: a position with respect to a known point, a rotational position about at least one axis of the feature, the horizontal position of the feature, and the relative position of the feature with respect to additional features. In various embodiments, the present invention is particularly well suited for evaluating the position of runway lights, particularly bi-directional runway lights which must be rotationally positioned within a high degree of accuracy. It will be expressly recognized, however, that the present invention is not limited to the measurement, placement, evaluation, etc. of any particular device and may be employed in a variety of operations and in the installation, adjustment, or evaluation of various features. Such features may include, for example, support columns, piles, municipal lighting features, highway and roadway signs and related supports, lighthouses, fence posts, paver edges, chair lift towers, and a wide variety of generic reference points such as may be used to mark or designate a curvature of a roadbed, track, etc., to name but a few.

In one embodiment, the present invention comprises a substantially rigid member having a first end and a second end and a plurality of plumb bobs attached thereto. For example, three plumb bobs may be distributed substantially evenly across a length of the substantially rigid member with first and second plumb bobs extending from a first end and a second of the member respectively and a third bob extending from a point substantially equidistant from the first and second ends. The third bob may be aligned or positioned over a reference point (e.g. a centered indentation) on a feature to be measured or installed. The first and second bobs will therefore be positioned at opposing points away from the center of the feature. The length of the rod, as will be recognized, extends beyond a predetermined radius of the feature to be installed and provides for increased radius and increased accuracy in the radial positioning of the feature.

A particular advantage of devices and methods of the present invention lies in that initial surveying operations may be performed to layout or mark predetermined points. For example, known surveying operations may be conducted so as to determine and/or mark predetermined reference points for a feature to be installed. The general x and y positioning of a feature may be determined and associated with a first point. Additionally, the radial position, such as may be prescribed by various standards and regulations, may be indicated by surveying, measuring, and/or marking one or more points at a distance away from a center point. Having marked three points, for example, devices of the present invention may then be employed to: 1—align a feature in the proper x and y positioning; 2—level the feature; and 3—establish the desired rotational position of the feature.

In certain embodiments, the substantially rigid member comprises a member of predetermined length. In alternative embodiments, it is contemplated that the substantially rigid member is selectively adjustable and capable of telescoping in order to expand or contract as may be needed or desired.

While preferred embodiments contemplate a rigid member extending equidistantly from a center of a feature, alternative embodiments provide for a single plumb bob or indicator extending radially away from a feature. For example, a rigid member may be secured or anchored at a center of a device and a rigid member or arm capable of downwardly projecting a point may be provided extending in only one direction.

In preferred embodiments, one or more plumb bobs are connected to the substantially rigid member via a string or wire, the string or wire being selectively adjustable in at least a vertical direction. Such adjustability allows for the bobs to be raised or lowered to a desired position, such as a position in close proximity with a reference point (e.g. a measured/surveyed point marked on the ground) in order to increase accuracy of measurements.

Devices of the present invention, in various embodiments, further comprise various leveling features, such as one or more bubble levels such that horizontal orientation of a feature in at least one plane may be confirmed or leveled prior to utilizing additional features of the invention.

In various embodiments, the present invention comprises features for adjusting and securing the orientation of a feature. In one embodiment, a stand is provided for supporting, adjusting, and/or securing a feature during installation operations. Various stands may be provided to accommodate a specific feature or device to be measured or installed. For smaller features, such as recessed runway lights, a stand comprising a plurality of vertically adjustable support members and one or more substantially horizontal members for supporting a feature is provided.

The present invention contemplates various novel methods for positioning a feature with respect to one or more known reference points. In one embodiment, for example, the desired geographical position of a feature is determined with respect to one or more known reference points. Indicia may thereafter be provided to mark the desired geographical position. Subsequently, the rotational orientation of the feature is determined and based on such indicia and features of the present invention. One of skill in the art will recognize various known devices and methods for surveying and establishing reference points. One of skill will further recognize various reference points from which features of the present invention may positioned, such as a predetermined point corresponding to the center of a radius of curvature about which one or more features are to be oriented, the corner of a plot, etc.

In one embodiment, a mount or bracket assembly is provided, the mount comprising a one piece square welded aluminum frame comprising one or more bolt sockets, the bolt sockets adapted for communication with a pre-existing feature. A cross-brace is provided in the bracket or mount, the cross brace comprising a centrally disposed hole, the centrally disposed hole corresponding to a center of a feature for location purposes. In addition to or in lieu of a centrally disposed hole or aperture, indicator means, such as a plumb bob or laser is/are provided to indicate alignment with a center of a feature to be secured.

In certain embodiments, a spacer is provided under the center of the cross-brace to maintain offset arm being placed at the center of a feature.

Provided on the mount or bracket assembly is one or more receiving means for receiving and securing a rigid member. In various embodiments, receiving means comprise colored features to allow for ease of differentiation by a user when viewed through various surveying equipment or at a distance.

Securing means, including one or more straps comprising hook and loop securing features, are provided on the mount to secure one or more rigid members and allow ease of transport of an assembled device. Securing means also enable quick disconnect and adjustment of a rigid member, as may be necessary or desirable to accommodate various different bolt patterns provided on different features.

In one embodiment, a surveying device comprising a mount unit and a rigid member extending therefrom is of one-piece construction. Such a device may be manufactured with (for example), the aid of computer numerical control (CNC) to increase accuracy and allow ease of assembly.

In various embodiments, indicator means comprise one or more battery powered laser pointers/levels. Plumb bobs may be provided in combination, particularly where risk of power loss is contemplated.

In various embodiments, the length of the substantially rigid member is adjustable. Substantially rigid members of the present disclosure contemplate telescoping features and/or extensions on one or both ends.

The present disclosure further contemplates one or more adaptors to allow use of a leveling device on various different features to be installed. It will be recognized that various different features are provided with various different hole/bolt patterns. Accordingly, to accommodate such patterns, an adaptor is provided such that the mount assembly and related components as shown and described herein may be used with more than one device or device pattern. Devices for use with such features include, but are not limited to light poles, signs, bridges, and foundation caissons where a specified rotation may be required.

U.S. Pat. No. 7,984,541 to Davidson, which relates to an anchor bolt supporting template, is hereby incorporated by reference in its entirety. Davidson, which relates to supporting anchor bolts within a cardboard mold while concrete is poured and hardened around the bolts, fails to disclose various novel features and benefits of the present invention.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
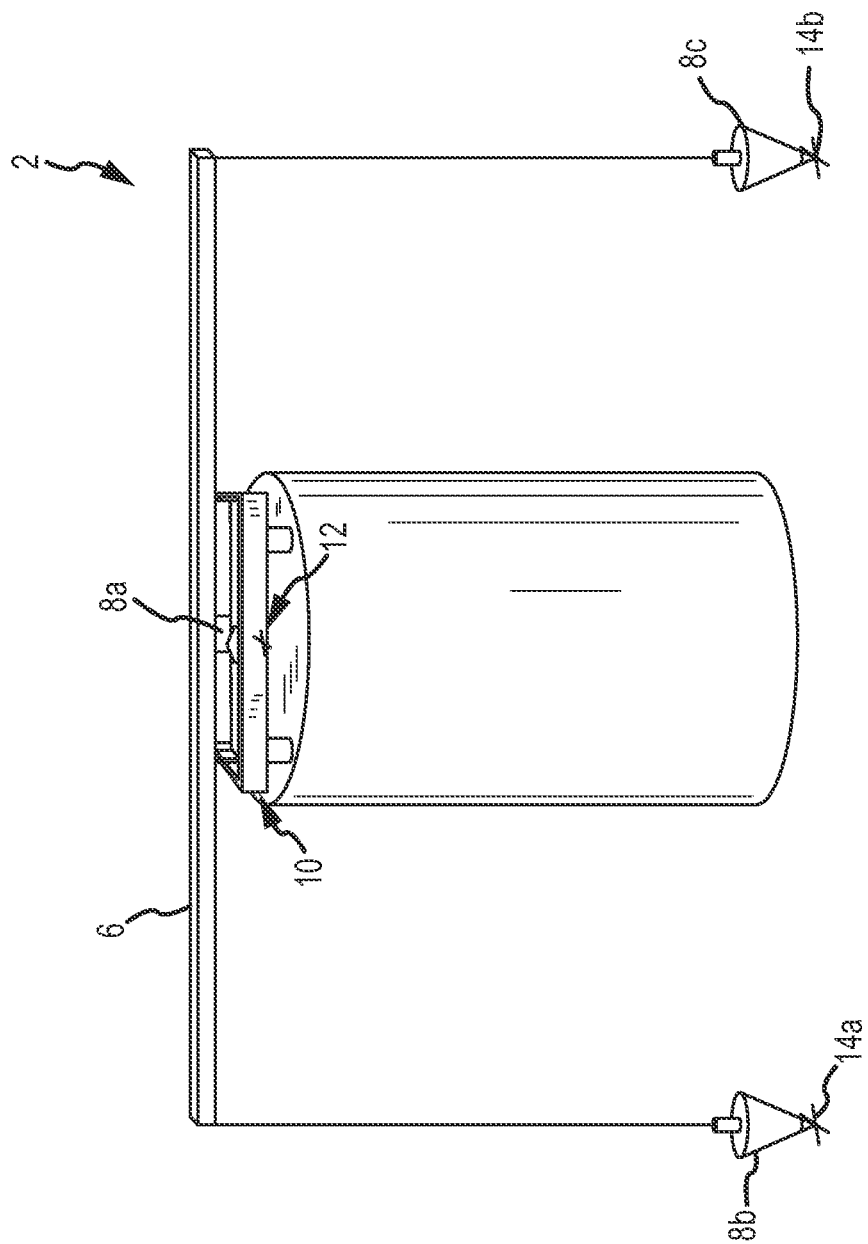
Figure 2:
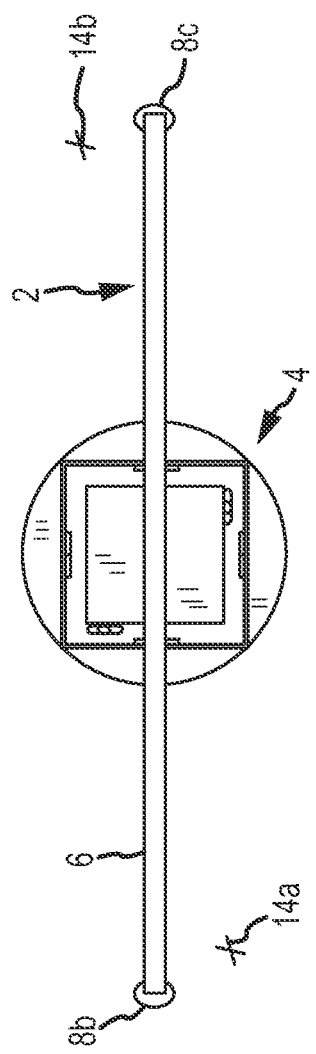
Figure 3:
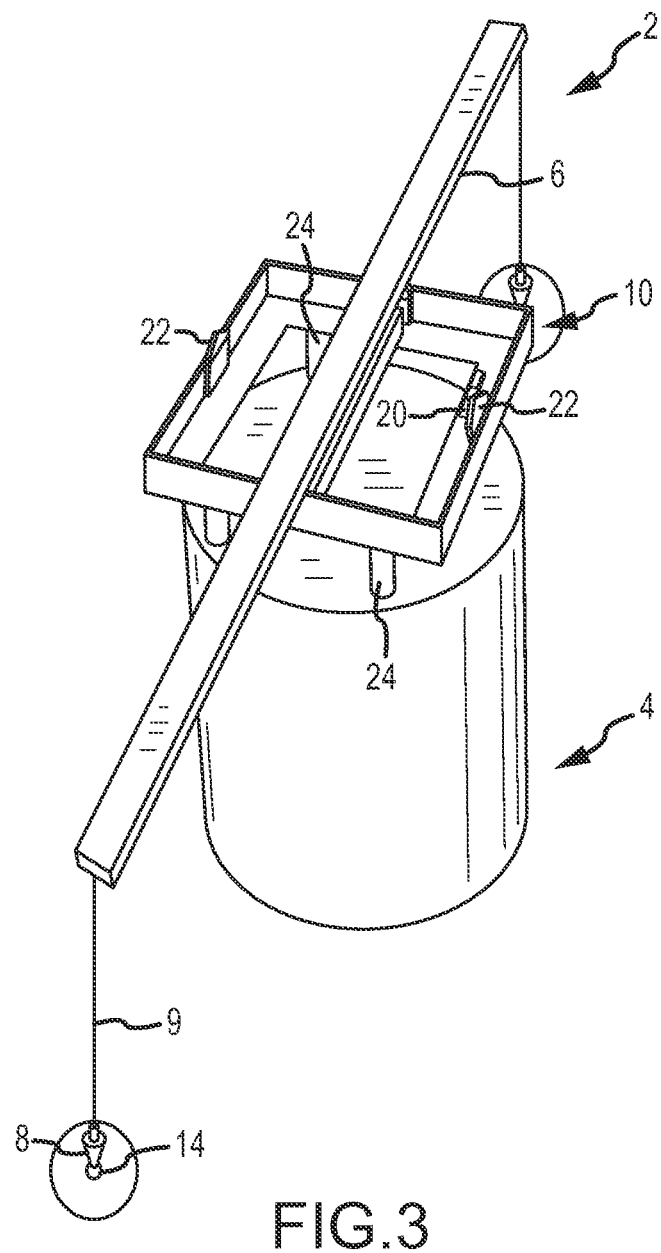
Figure 4:
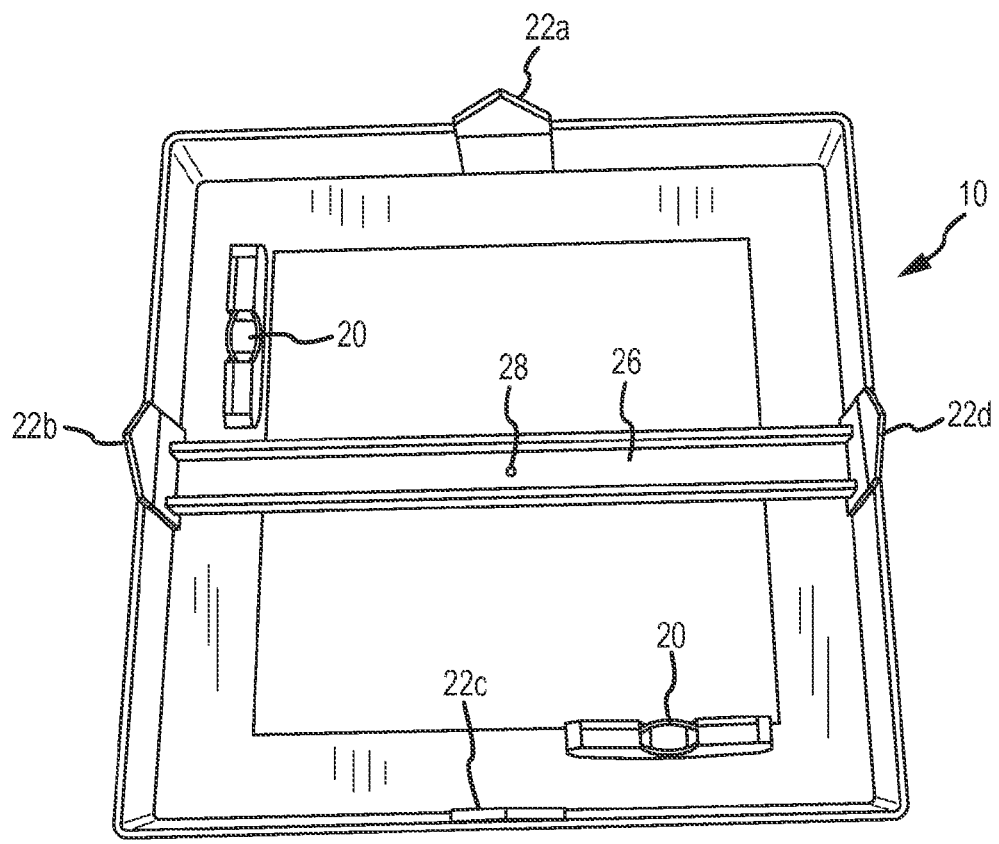
Figure 5:
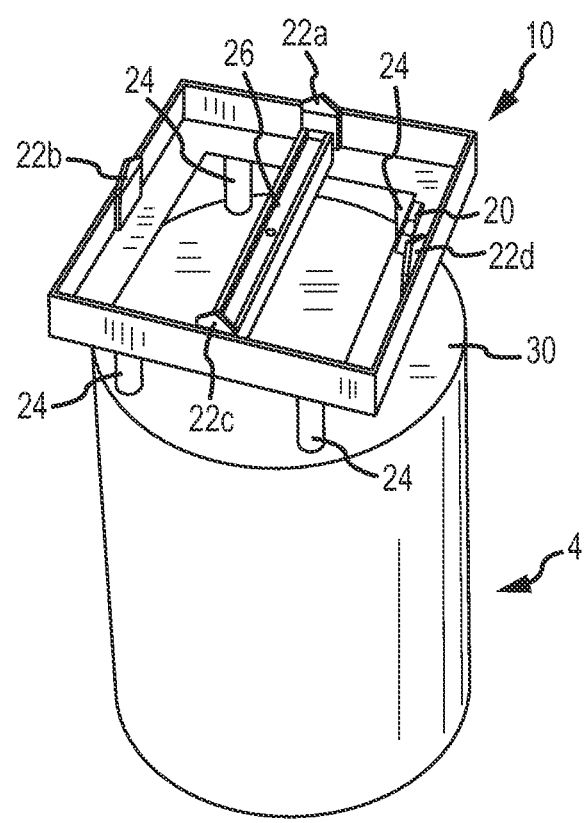

FIG. 1 is a front perspective view of one embodiment of the present disclosure;

FIG. 2 is a top elevation view of one embodiment of the present disclosure;

FIG. 3 is a perspective view of a surveying and leveling device according to one embodiment of the present disclosure;

FIG. 4 is a perspective view of one embodiment of a component of a surveying and leveling device according to one embodiment of the present disclosure;

FIG. 5 is a front perspective view of one embodiment of the present disclosure in communication with a feature to be installed or secured.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent, there is no intent to limit the meaning of that term, either expressly or by implication, beyond its plain or ordinary meaning, and such term should not be interpreted to be limited in scope based on any statement made in any section of this patent. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

Referring now to FIGS. 1-2, a surveying, measuring, and leveling device according to various embodiments of the present invention is shown. It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

As shown in FIG. 1, a device 2 is provided and shown in attachment with a feature 4. Feature 4 may comprise, by way of example only, a runway light, post, or any number of features designed to be secured in a specific orientation. Device 2 comprises a substantially rigid member 6, plumb bobs 8a, 8b, 8c, and a leveling mount 10. The leveling mount 10 may be placed or secured on the feature 4 through a variety of means, such as preexisting holes and fasteners, magnets, etc. While the leveling mount 10 need not necessarily be secured to the feature 4 and may alternatively be placed or simply rest on the feature 4, one of skill in the art will recognize that it is preferable to secure the mount 10 and member 6 so to maximize accuracy of various measurements. In one embodiment, the leveling mount 10 comprises a rigid rectangular member with an open center portion to allow for line of sight and access to a reference point 12 on the feature 4. Reference point 12 may correspond, for example, to the geometrical center of the feature 4.

The leveling mount 10 may be placed on or secured to the feature 4 and the feature 4 leveled in one or more planes as indicated by, for example, bubble levels disposed on the mount 10 and/or member 6. A substantially rigid member 6 may be provided in combination with the leveling mount and centered with respect to the feature 4 by aligning a plumb bob 8a with a center point of the feature 12. As will be recognized, once the center bob 8a is aligned with a center of the feature 4, opposing ends of the member 6 and associated bobs 8b, 8c will disposed radially away from the feature at substantially the same distance. Bobs 8b, 8c, which may be adjustable in the vertical direction, then indicate both the translational and rotational offset of the feature 4 with respect to predetermined reference points 14a, 14b. While plumb bobs are contemplated for use in various embodiments, the present invention is not limited to such devices. Indeed, a wide variety of devices for projecting and/or indicating a point may be employed in addition to or in lieu of a known plumb bob. For example, in one embodiment, self-leveling lasers are provided to project and indicate a point vertically below various points of the rigid member 6.

Predetermined reference points may be determined and marked by a variety of known surveying processes and/or devices. Such known devices, while useful for marking specific points, fail to provide reliable and efficient means for determining and acquiring the correct rotational position of a feature, for example. Devices and methods of the present invention contemplate and provide such means.

In various embodiments, leveling mount 10 comprises features for receiving member 6 such that member 6 is properly aligned. For example, leveling mount 10 may comprise dog-ears, protrusions, grooves, posts, or various similar features to receive the member 6 in a specific manner (i.e. one that is in proper alignment).

A unique advantage of the present invention is that points 14a, 14b may be determined based on various known surveying methods, for example, and a feature 4 appropriately positioned with respect thereto. Points 14a, 14b may be determined by sighting and/or measuring from a known point, such as a known center of a radius of curvature, and marked with appropriate indicia. Once reference points 14a, 14b are established, accurate translational and rotational positioning of a feature 4 may be performed with respect to the points 14a, 14b by using the novel features of the present invention as shown and described herein. For example, the relative position of guide lights for embedment in an airport runway may be determined and mapped with the use of various surveying instruments and known standards. Marking off specific points using a TotalStation, for example, still requires that one or more users accurately position, align (e.g. in a rotational direction), and level the light prior to securing the same. Embodiments of the present disclosure provide means for aligning devices to a preferred, desired, or required rotational position, while also ensuring correct translational placement and leveling of such devices.

Referring now to FIG. 2, a top plan view of one embodiment of the present invention is shown. A feature 4 is provided with a substantially rigid member 6 secured thereto. Predetermined points 14a, 14b are provided. Points 14a, 14b comprise surveyed or measured points corresponding to, for example, the proper rotational position of a feature 4. Preferably, the exact location of the feature 4 is represented by a point equidistant from points 14a, 14b. As shown, the feature 4 is slightly offset from its desired final position. Plumb bobs 8b, 8c extending downwardly from the distal ends of the member 6 should be aligned directly over predetermined points 14a, 14b. Accordingly, feature 4 as depicted should be rotated and/or translated until plumb bobs 8b, 8c are positioned directly over predetermined points 14a, 14b. Once feature 4 is aligned with the predetermined points as indicated by the tool 2, the feature 4 will be in its desired rotational position and may be appropriately secured and the tool 2 removed from the feature 4.

In various embodiments, a frame or support structure may be provided to support and/or adjust feature 4 during various operations. For example, a rigid structure may support the weight of a feature 4, such as a light can, prior to securing the feature 4 in a final position. Required adjustments as may be indicated by the tool 2 may be performed by positioning the frame 10, which is preferably secured to the feature 4. The support frame, in various embodiments, comprises adjustable features including, but not limited to, telescoping leg or support features for leveling the feature 4.

FIG. 3 is a perspective view of one embodiment of the present disclosure comprising a mount 10 in communication with a feature 4. The feature 4, as previously stated, may comprise any number of objects including, but not limited to, light canisters, poles, utility vaults, etc. A substantially rigid member 6 extending outwardly from the mount 10 and feature 4 is selectively provided in communication with the mount 10. At least one indicator means 8 is provided, the indicator means 8 preferably extending vertically downward from the rigid member 6.

A plurality of bolt sockets 24 are provided on a lower portion of the mount 10, the bolt sockets 24 for interconnecting the device 2 to a feature in a generally secure manner. When secured to a feature 4 as shown, the device 2 and feature may be rotated or moved as a unit until a desired position (e.g. as indicated by indicator means 8) is achieved. Once the desired position is achieved and secured, the device 2 is removed from the feature and available for use in subsequent operations. At least one leveling device 20 is provided on the mount 10. Preferably, two leveling devices 20 are provided to ensure that the mount is level in at least two horizontal planes. The rigid member 6 is disposed on receiving means, with additional receiving means 22 provided for an alternative positioning of the rigid member 6. In one embodiment, receiving means 22 comprise upwardly protruding features for receiving the rigid member 6 in a stable position. It will be recognized, however, that receiving means of the present disclosure are not limited to any particular size or shape. Various different receiving means are contemplated, including, for example, notches, magnets, channels, etc.

FIG. 3 depicts a device 2 and a feature 4 provided generally in alignment with at least one predetermined reference point 14. A plumb bob 8 is provided on an associated string or cable 9 to indicate that the translational and rotational position of the feature 4 is aligned with one or more pre-measured or pre-determined reference points 14.

Thus, an aspect of the present disclosure is to provide means for indicated the rotational position of an object with respect to fixed and/or pre-determined reference point(s). One aspect of the present disclosure useful for accomplishing this is the rigid member 6 and indicator means 8 as shown and described. Various alternatives, however, are also contemplated. For example, in one embodiment, it is contemplated that one or more lasers are provided to project a visible line on a ground surface, the visible line intersecting predetermined reference points 14 when the feature 4 and associated mount 10 are in the appropriate yaw or rotational position. Such laser features include, for example, one or more self-leveling lasers provided on a mount 10.

FIG. 4 is a top perspective view of a mount 10 according to one embodiment, the mount 10 shown in isolation. The mount 10 generally comprises a rigid and substantially square frame. As shown, a plurality of receiving members 22a, 22b, 22c, 22d are provided for receiving a rigid member. A plurality of levels 20 are provided on the frame to indicate the position or offset from level in two dimensions. Levels 20, although generally depicted as bubble levels in FIG. 4, may comprise any one or more known level devices, including electronic or digital level devices. To ensure alignment of the center of the mount 10 with the center of an associated feature 4, an aperture 28 is provided in member 26, to allow for visual alignment with a point or mark on the center of the feature 4.

FIG. 5 depicts a mount 10 according to one embodiment provided on a feature 4. The mount 10 comprises various features as shown and described herein. As shown, the mount 10 is placed securely on a feature 4 to be adjusted and installed. The feature 4, which preferably has a flat, level upper surface 30, securely receives bolt sockets 24 of the mount 10. The feature 4 and mount 10 may then be leveled in at least two planes (e.g. corresponding to roll and pitch of the feature) with reference to at least two levels 20 provided on the mount 10. Once properly aligned in the roll and pitch aspects, a rigid member (not shown, but 6 in FIG. 3) may be introduced and secured to the mount, the member useful for measuring and adjusting the rotation or yaw of the feature 4.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A device for measuring and adjusting the position of a lighting element comprising:
    a frame member for mounting on an upper portion of said lighting element, said frame member comprising two female socket members for receiving first and second upwardly projecting portions of said lighting element and temporarily securing said frame member and said lighting element to each other, and the frame member comprising at least one upwardly projecting member for receiving a first horizontally extending member;
    said first horizontally extending member comprising an elongate substantially rigid member having a first end and a second end, said first end and said second end comprising vertically downward extending members for indicating a rotational position of said frame member about a vertical axis;
    said frame member comprising a first level for indicating the position of said frame member relative to a first horizontal axis, and a second level for indicating the position of said frame member relative to a second horizontal axis;

an aperture provided in a second horizontally extending of the frame member for visually aligning a midpoint of said frame member with a center of said lighting element; and wherein said device is selectively detachable with said lighting element and adapted to indicate a preferred translational and rotational position of said lighting element.

2. The device of claim 1, wherein said vertically downward extending members comprise plumb bobs.

3. The device of claim 1, wherein said vertically downward extending members comprise self-leveling lasers.

4. The device of claim 1, wherein said first level and said second level comprise bubble levels.

5. The device of claim 1, wherein the length of said elongate substantially rigid member is a telescoping member.

6. A device for measuring and adjusting the position of a light canister comprising:

a frame member for mounting to an upper portion of said light canister, said frame member comprising a first level for indicating the position of the frame member and the light canister with respect to a first axis of rotation and a second level for indicating the position of the frame member and the light canister with respect to a second axis of rotation;

an elongate substantially rigid member having a first end and a second end, said first end and said second end comprising indicator means for alignment with a predetermined point, said indicator means facilitating alignment of the object about a vertical axis of rotation.

7. The device of claim 6, wherein said indicator means comprises a plumb bob.

8. The device of claim 6, wherein said indicator means comprises a self-leveling laser.

9. The device of claim 6, wherein said frame member comprises a plurality of female socket members for securing said frame member to said light canister.

10. The device of claim 6, wherein said frame member comprises a plurality of receiving members for receiving said elongate substantially rigid member.

11. The device of claim 6, wherein the length of said elongate substantially rigid member is adjustable in a lengthwise direction.

12. The device of claim 10, wherein the receiving members comprise point projections for slidably engaging said elongate substantially rigid member.

13. A method of aligning an object in a predetermined rotational position about a vertical axis and at least one horizontal axis, the method comprising the steps of:

determining a first point and a second point, said first point and said second point related to a desired rotational position of said object about a vertical axis;

placing said object generally between said first point and said second point;

providing an elongate substantially rigid member having a first end and a second end, said first end and said second end comprising means for vertically projecting a point, at least one level corresponding to a horizontal plane in communication with said rigid member, and means for indicating the midpoint between said first end and said second end;

placing said rigid member in communication with said object;

determining, based on said means for vertically projecting a point, whether or not the rotational position of the object corresponds to said desired rotational position;

based on said determining step indicating that the rotational position of the object does not correspond to said desired rotational position, repositioning said object by rotating the object about said vertical axis; and based on said determining step indicating that the rotational position of the object does correspond to said desired rotational position, securing said object.

14. The method of claim 13, wherein said object comprises at least one of a light canister, a concrete forming tube, a caisson, a sign post, a precast pillar, and a light standard.

15. The method of claim 13, wherein said desired rotational position is predetermined by surveying operations.

16. The method of claim 13, wherein said means for vertically projecting a point comprises at least one of a plumb bob and a self-leveling laser.

17. The method of claim 13, wherein the length of said rigid member is adjusted to a desired length prior to determining whether or not the rotational position of the object corresponds to said desired rotational position.

* * * * *